United States Patent
Ding et al.

[11] Patent Number: 6,049,606
[45] Date of Patent: Apr. 11, 2000

[54] CIRCUIT AND METHOD OF DOUBLE TALK DETECTION FOR USE IN HANDSFREE TELEPHONY TERMINALS

[75] Inventors: Heping Ding, Kanata; Frank Lau, Richmond, both of Canada

[73] Assignee: Nortel Networks Corporation, Montreal, Canada

[21] Appl. No.: 08/989,270

[22] Filed: Dec. 11, 1997

[51] Int. Cl.[7] .................................................. H04M 9/08
[52] U.S. Cl. ..................... 379/406; 379/407; 379/410; 381/66
[58] Field of Search ................... 379/406, 407, 379/408, 409, 410, 411, 345; 381/66, 94.1, 57, 71.1, 94.3; 370/286, 291

[56] References Cited

U.S. PATENT DOCUMENTS

| | | | |
|---|---|---|---|
| 5,027,410 | 6/1991 | Williamson et al. | 381/68.4 |
| 5,029,204 | 7/1991 | Shenoi et al. | 379/407 |
| 5,371,760 | 12/1994 | Allen et al. | 375/1 |
| 5,475,731 | 12/1995 | Rasmusson | 379/411 |
| 5,592,548 | 1/1997 | Sih | 379/410 |
| 5,617,478 | 4/1997 | Tagami et al. | 381/56 |
| 5,633,936 | 5/1997 | Oh | 381/66 |
| 5,646,990 | 7/1997 | Li | 379/390 |
| 5,657,384 | 8/1997 | Staudacher et al. | 379/388 |
| 5,668,865 | 9/1997 | Duttweiler et al. | 379/410 |
| 5,717,820 | 2/1998 | Hamasaki et al. | 704/231 |
| 5,818,945 | 10/1998 | Makino et al. | 381/66 |
| 5,838,787 | 11/1998 | Ding et al. | 379/409 |
| 5,903,232 | 5/1999 | Zarubinsky et al. | 341/61 |

*Primary Examiner*—Forester W. Isen
*Assistant Examiner*—Jacques M. Saint-Surin
*Attorney, Agent, or Firm*—Frank P. Turpin; Dallas F. Smith

[57] ABSTRACT

The invention provides an audio subsystem for use in a telephone terminal operable in handsfree mode and comprises a receive path including a receive transducer for generating audio signals from a received signal and a transmit path including a transmit transducer for converting audio signals to electrical signals for transmission to a far-end user. An acoustic echo canceller is communicatively coupled between the receive path and the transmit path and includes a subtractor circuit connected serially with the transmit transducer. The echo canceller is responsive to control signals for controlling the subtractor circuit. The subsystem comprises means for detecting a near-end talking condition including first circuit means for measuring the level of the total energy of the out-of-telephony-band components in the signal from the transmit transducer and circuit means for comparing the energy level represented by an output signal from the first measurement circuit to a first predetermined threshold. If the measured energy level exceeds the predetermined threshold, near-end talking activity is deemed to exist. There is also provided a second measurement circuit for measuring the level of the signal on the receive path and for comparing it to a second predetermined threshold whereby if the latter is exceeded, far-end talking activity is determined to exist. Thus, if both measured signals exceed their respective threshold, a double talk situation is deemed to exist.

21 Claims, 3 Drawing Sheets

PARAMETERS OF BANDSTOP FILTER

| | |
|---|---|
| IIR DESIGN | |
| FILTER TYPE | BAND STOP |
| PASSBAND RIPPLE IN -dB | -.8000 |
| STOPBAND RIPPLE IN -dB | -50.0000 |
| PASSBAND CUTOFF FREQUENCIES | .200000E+03    .460000E+04 HERTZ |
| STOPBAND CUTOFF FREQUENCIES | .250000E+03    .400000E+04 HERTZ |
| SAMPLING FREQUENCY | .160000E+05 HERTZ |

FIG. 2

CIRCUIT AND METHOD OF DOUBLE TALK DETECTION FOR USE IN HANDSFREE TELEPHONY TERMINALS

BACKGROUND OF THE INVENTION

1. Field of the Invention

This invention relates generally to echo cancellers and more particularly to a novel circuit and method for detecting near-end talking activity and double talk situations thereby to effectively control the convergence function of an acoustic echo canceller (AEC).

2. Description of Background and Related Art

The presence of echoes in long-distance telephony is a thorny problem. A long-distance communication circuit usually comprises four-wire and two-wire segments; these are joined at each end by hybrid circuits. Impedance mismatch in a hybrid circuit causes a portion of the signal received at the hybrid circuit to be reflected back onto the transmit four-wire segment whence it came and this reflected signal is perceived as echo to the speaker who originated it. Adaptive echo cancellers are thus employed to minimize the echo signal created on four-wire transmission lines.

Normally, a four-wire receive signal is at a higher level than its echo signal on the four-wire transmit path because there is loss across the hybrid circuit. Near end speech on the transmit path will therefore typically be stronger than the echo signal. However, near end speech is unwanted noise as far as convergence of the echo canceller is concerned since it would diverge the canceller if it were to continue updating its estimated impulse response while near end speech is present. Various techniques and schemes have therefore been developed to provide double talk detection in echo cancellers.

The problem of echo cancellation on the telephone network is exacerbated by the connection of a handsfree terminal at one or both ends of the transmission line. Double talk detection (DTD) in a handsfree system refers to the determination of whether, in the microphone output, there is near-end speech mixed with a probably much stronger far-end speech played through the loudspeaker. By comparison with double talk detection for network echo cancellation applications, the DTD in an acoustic echo cancellation handsfree (ECHF) system is more likely to be subjected to sudden echo path changes as well as to echo levels that are much above the level of near-end speech. This is due to the fact that, in a handsfree terminal, the receive transducer or speaker is closer to the microphone of the terminal than the near-end user; furthermore, the case of the terminal conducts a substantial amount of acoustic energy from speaker to microphone. In a typical implementation, it is not unusual for the far-end signal from the loudspeaker to be as large as 25 db (decibel) above the level of the near-end signal. The near-end activity by a user is therefore difficult to ascertain because the far-end signal from the loudspeaker will mask at least a portion of the signal from the near-end user.

Numerous schemes of double talk detection have been devised and usually fall into one of three categories. A first category which may be labelled the energy comparison scheme usually employs power detectors for detecting the average power, the peak power and the residual power of various signals to generate the output signal of the double talk detector. Example circuits of this type of double talk detectors are described in U.S. Pat. Nos. 4,360,712; 5,463,618 and 4,645,883.

A second category which may be labelled a cross correlation technique is basically an extension of the energy comparison category; it adds a cross-correlation criterion between various signals to arrive at a control decision. This scheme is more complicated than the energy comparison technique and requires additional memories and computational power. Examples of this type of double talk detection may be found in U.S. Pat. Nos. 5,646,990 and 5,193,112.

Yet a third category is related to the cross correlation technique. It monitors the directions of the updating vectors for the echo canceller which are given by an adaptation algorithm such as NLMS (Normalized Least Mean Square). If the updating vectors over a number of samples all roughly point at a common direction, the echo canceller is in the converging mode. If, on the other hand, the vectors point at various diverse directions, the echo canceller is deemed to have converged. This decision process together with the energy of the signals are then used to determine whether a double talk condition exists. This scheme may provide a reliable result but is very computation intensive. DTD implementations based on monitoring updating vectors may be found in U.S. Pat. No. 4,918,727 as well as the paper: "A New Double-Talk Detection Algorithm Based On The Orthogonality Theorem" by Hua Ye and Bo-Xiu Wu, IEEE Transactions on Communications, Vol. 39, No. 11, November 1991.

Most of the known techniques and schemes of the prior art were developed for use in network echo cancellations and probably perform adequately in that environment; however, their performance in ECHF applications is not entirely satisfactory. The main reason, as mentioned above, is that in a handsfree environment, the portion of the far-end signal from the loudspeaker appearing as echo at the microphone of the terminal is usually much stronger than the near-end signal, and the difference in a typical implementation can be as large as about 25 db. The far-end signal from the loudspeaker tends to mask the signal from the near-end user and makes the determination of double talk conditions very difficult using the known techniques.

SUMMARY OF THE INVENTION

An analysis of the environment of handsfree telephony indicates that the far-end speech is a relatively narrow-band signal because it is received over the telephone network; it therefore contains only frequency components in the telephony band. The near-end speech, on the other hand, has a wider bandwidth than the telephony band. Therefore, if the telephony-band signals are filtered out of the mixed signal at the output of the microphone, the existence of near-end user activity may effectively be ascertained.

It is therefore an object of the invention to provide a relatively simple and effective DTD circuit particularly adapted for use in ECHF applications.

It is a further object of the invention to provide a circuit and method for the detection of near-end activity by a user of a handsfree telephone terminal.

It is thus a still further object of the invention to provide a circuit for the detection of double talk conditions based on the total energy content of the out-of-telephony-band components in the mixed signal at the output of a microphone in a handsfree telephone terminal.

Therefore, from a first aspect, the invention provides an audio subsystem for use in a telephone terminal operable in handsfree mode and comprising a receive path including a receive transducer for generating audio signals from a received signal and a transmit path including a transmit transducer for converting audio signals to electrical signals for transmission to a far-end user. An acoustic echo canceller is communicatively coupled between the receive path and the transmit path and includes a subtractor circuit connected serially with the transmit transducer. The echo canceller is responsive to control signals for controlling the subtractor circuit. The subsystem comprises means for detecting a near-end talking condition including first circuit means for measuring the level of the total energy of the out-of-telephony-band components in the signal from the transmit transducer and circuit means for comparing the energy level represented by an output signal from the first measurement circuit to a first predetermined threshold. If the measured energy level exceeds the predetermined threshold, near-end talking activity is deemed to exist.

From another aspect of the invention, there is provided a second measurement circuit for measuring the level of the signal on the receive path and for comparing it to a second predetermined threshold whereby if the latter is exceeded, far-end talking activity is determined to exist. Thus, if both measured signals exceed their respective threshold, a double talk situation is deemed to exist.

From yet another aspect, the invention provides a method for detecting a near-end talking condition in an acoustic echo canceller for use in a telephone terminal operable in handsfree mode. The method comprises the steps of measuring the level of the total energy of the out-of-telephony-band components in the signal from the transmit transducer of the terminal and comparing the measured energy level with a first predetermined threshold. If the measured energy level exceeds the first predetermined threshold, near-end talking activity is determined to exist. In a similar manner, the energy level on the receive path of the terminal may be measured and compared to a second predetermined threshold. If both measured energy levels exceed their respective threshold, a double-talk situation is deemed to exist.

BRIEF DESCRIPTION OF THE DRAWINGS

FIG. 2 is a data table showing example parameters of a bandstop filter illustrated in FIG. 1.

DETAILED DESCRIPTION OF THE DRAWINGS

Figure 1:
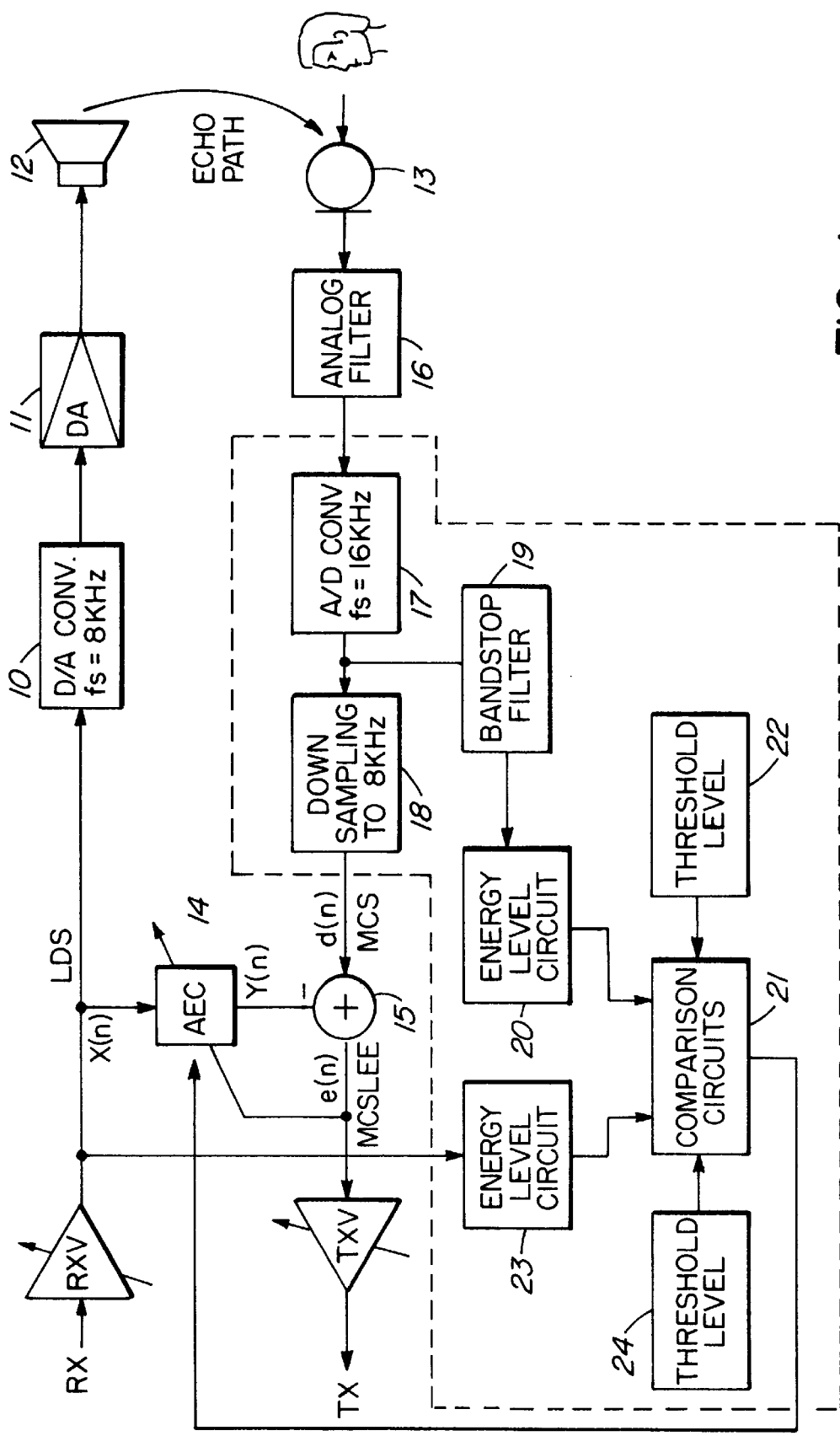
FIG. 1 is a block diagram of a simplified echo canceller handsfree system illustrating the circuit of the invention.

FIG. 1 illustrates a simplified block diagram circuit for an echo canceller system adapted for use in a handsfree telephone terminal. It shows a receive path RX including a receive signal variolosser RXV, a digital to analog converter 10 having a sampling frequency of 8 Khz, and a power amplifier 11 for driving a receive transducer such as speaker 12. A transmit path also includes a variolosser TXV and a microphone 13. As is well known in the art, variolossers such as RXV and TXV serve to attenuate the amplitude of both the receive and transmit signals. The amount of loss provided by the respective variolossers is usually controlled by the system's digital signal processor (DSP—not shown) responsive to a voice signal activated switch. As the loss provided by the receive variolosser increases, the loss provided by the transmit variolosser is decreased proportionately. This arrangement performs quite adequately in a half-duplex system, that is, a system in which any party to a connection cannot hear and be heard at the same time.

It is also known in the art to incorporate both receive and transmit variolossers in conjunction with an acoustic echo canceller AEC in order to meet the echo return loss targets mandated by operational standards of the telephone network. The AEC, also controlled by the DSP, makes an estimate of the echo on the receive path and subtracts that amount from the transmit path.

FIG. 1 also shows an AEC 14 communicatively coupled between the transmit and receive paths in a known manner. The AEC 14 includes a substractor circuit 15 serially connected in the transmit path. The various signals associated with the AEC are conventionally denoted as X(n), Y(n), e(n) and d(n). The notation LDS denotes the loudspeaker signal, MCS the microphone signal and MCSLEE the microphone signal less the echo estimate made by the AEC 14.

Also, connected serially between the microphone 13 and the substractor 15, is an analog filter 16 usually denoted as an anti-aliasing filter having a bandpass of between 40 Hertz and 7 Khz. Connected between the filter 16 and the subtractor 15 is an analog to digital converter 17 operating at a sampling frequency of 16 Khz and a factor-of-two down sampling circuit 18 providing signals at a sampling frequency of 8 Khz to the subtractor 15. A bandstop filter 19 is connected at the junction of circuits 17 and 18 and provides an output signal to an energy level circuit 20.

FIG. 2 is a table illustrating example parameters of a filter 19 useful in the realization of the invention. The filter 19 may be of the infinite impulse response (IIR) type and its design may be generated with the software package "QEDesign" available from Momentum Data Systems, Costa Mesa, Calif., USA. FIG. 2 indicates that the example bandstop loss was set at 50 dB in the stopband of 250 Hertz to 4 Khz for a sampling frequency of 16 Khz. Also, the low passband cutoff frequency of the filter is set at 200 Hertz to ensure that the fundamental frequency of the near-end talker is within the lower passband for a majority of users. A limited collection of speech samples from a variety of humans indicated that the fundamental frequency of male users was about 100–160 Hertz and that of female users ranged from about 160 to 220 Hertz. A larger sampling of speech samples would likely yield a different range of fundamental frequencies. It is thus evident that the parameters of the filter 19 should be selected to suit the target population.

As discussed above, the far-end signal from the loudspeaker is usually much stronger than the near-end signal, and the difference in a typical implementation may be as large as about 25 dB. The filter 19 must therefore have a stopband loss large enough to ensure that the far-end speech from the loudspeaker is suppressed enough so as not to trigger a false detection of near-end activity. Although a stopband loss of 50 dB was selected in the described embodiment, it is quite possible that a different amount of loss may be used and still provide adequate results.

The energy level circuit 20 functions to measure the filtered signal from the microphone 13 and thus provides a measure of the total energy of the out-of-telephony-band components in the mixed signal. The circuit 20 measures the level of the signal by finding a temporally averaged version of the squares of the corresponding input. An exponential weighting function is used to find the energy levels, with more emphasis on recent samples. The input/output relationship of the circuit 20 is output(n)=(1−1/L) output(n−1)+ (1/L) input$^2$(n). In this equation L is the number of samples corresponding to a 4 millisecond interval and thus equals 64 for the 16 Khz sampling frequency of the A/D converter 17.

A circuit 21 compares the output level at the output of circuit 20 with a predetermined threshold level represented by circuit block 22. A useful threshold may be determined by looking at the average level of the sum at the output of circuit 20 while there is not speech and the average level of the sum while there is speech present. The threshold can then be selected to be a level somewhere between the two levels. If the output signal from circuit 20 exceeds the predetermined threshold level of circuit block 22, near-end talking activity is determined to exist.

The level of the received signal LDS is measured in a circuit 23 in a manner identical to that described for circuit 20. The digital signal on the receive path is the result of voice sampled at 8 Khz as is conventional in the telephone network; therefore, in this case, L equals 32 samples. The output signal of circuit 23 is compared to a threshold represented by circuit block 24. This threshold may be determined in a manner similar as that of circuit block 22. If the signal at the output of circuit 23 exceeds the threshold level of circuit 24, the comparison circuit 21 determines that far-end talking exists. If the level of circuits 20 and 23 each exceed their respective threshold, double talk is deemed to exist and the AEC is controlled accordingly. Under some circumstances, it may be desirable to also use the output of circuit 21 to control the function of variolossers RXV and TXV.

Figure 3:
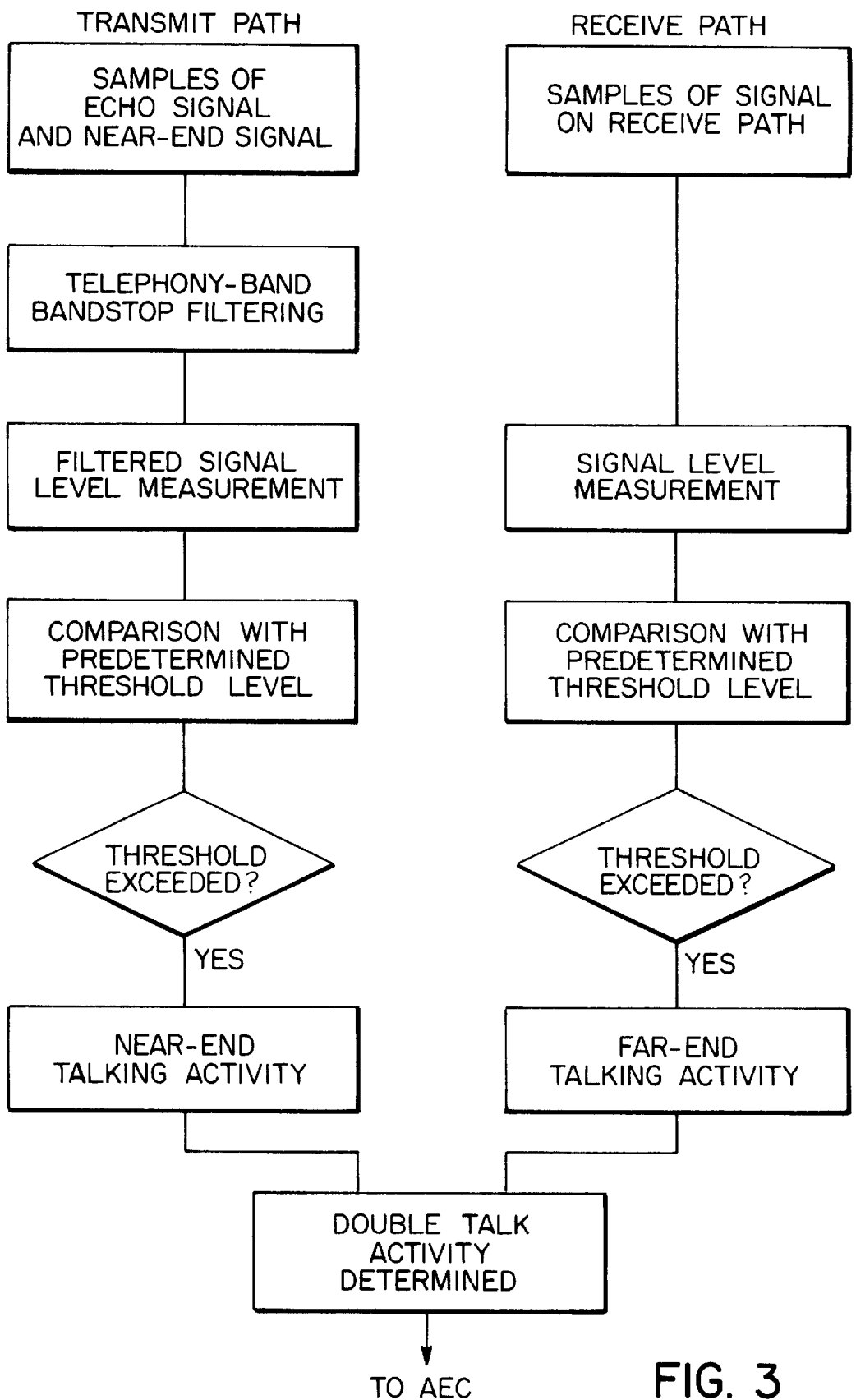
FIG. 3 is a flow chart illustrating the operation of the circuit of FIG. 1.

FIG. 3 is a flow chart illustrating the operation of FIG. 1. The echo path signal from the receive transducer 12 together with the near-end signal from a user is filtered in circuit 16 and converted to a digital signal in A/D converter 17 using a sampling frequency of 16 Khz. The output of the converter 17 is then down-sampled to 8 Khz and fed to the subtractor 16 in the conventional manner. The output of the converter 17 is also fed to the bandstop filter 19 that effectively removes all telephony-band frequency components from the mixed signal. The signal level at the output of filter 19 is then measured and compared to a predetermined threshold. At the same time, the LDS signal on the receive path is measured and compared to a respective threshold. If the levels at the output of circuits 20 and 23 each exceed their respective threshold, a double talk situation is determined to exist.

Because the disclosed DTD implementation extracts its input samples before the subtraction point of the AEC, its performance is completely independent of the convergence status of the latter. In other words, the convergence status of the AEC or the occurrence of an abrupt echo path change does not affect the operation of the DTD scheme. Therefore, the invention provides a reliable and relatively simple DTD scheme for use in ECHF applications.

Although a particular embodiment of the invention has been illustrated and described, it is apparent that various changes can be introduced. For example, the parameters of the bandstop filter can be modified and the level measurement techniques changed without departing from the scope and spirit of the invention.

We claim:

1. An audio subsystem for use in a telephony terminal operable in handsfree mode comprising:
   a receive path including a receive transducer for generating audio signals from a received signal;
   a transmit path including a transmit transducer for converting audio signals to electrical signals for transmission to a far-end user;
   an acoustic echo canceller communicatively coupled between the receive path and the transmit path, including a subtractor circuit connected serially with the transmit transducer, the acoustic echo canceller being responsive to control signals for controlling the subtractor circuit; and
   means for detecting a near-end talking condition comprising first circuit means for measuring the level of the total energy of the out-of-telephony-band components in the signal from the transmit transducer and circuit means for comparing the energy level represented by an output signal from the first measurement circuit to a first predetermined threshold, whereby if the measured energy level exceeds the first predetermined threshold, near-end talking activity is deemed to exist.

2. An audio subsystem as defined in claim 1 and further comprising a second circuit for measuring the energy level of the audio signal on the receive path and provide a corresponding signal, said comparing circuit being responsive to the corresponding signal for comparing it to a second predetermined threshold to determine if the far-end user is speaking, whereby if both the near-end and far-end users are speaking, a double talk condition exists, the comparing circuit including means for generating control signals to the acoustic echo canceller.

3. An audio subsystem as defined in claim 2 wherein the first circuit means comprises a bandstop filter having predetermined characteristics, its input being connected to the transmit path between the transmit transducer and the subtractor circuit and its output being connected to a first energy level measurement circuit whose output is connected to a first input of the comparing circuit means.

4. An audio subsystem as defined in claim 3 wherein the first circuit means further comprises an analog to digital converter operating at a sampling frequency of sixteen kilohertz, and a factor-of-two down sampling circuit, the converter and down sampling circuit being connected serially between the transmit transducer and the subtractor circuit, the junction of the converter and down sampling circuit being connected to the input of the bandstop filter.

5. An audio subsystem as defined in claim 4 wherein the low passband cutoff frequency of the bandstop filter is selected to ensure that the fundamental frequency of the near-end talker is within the lower passband for the majority of talkers.

6. An audio subsystem as defined in claim 5 wherein the low stopband cutoff frequency of the bandstop filter is set to about 250 hertz.

7. An audio subsystem as defined in claim 6 wherein the high stopband cutoff frequency of the bandstop filter is set to about 4 Khz.

8. An audio subsystem as defined in claim 5 wherein the stopband loss of the bandstop filter is selected to be adequate to prevent any signal within the selected frequency stopband of the filter from passing therethrough.

9. An audio subsystem as defined in claim 8 wherein the stopband loss of the bandstop filter is selected to be about 50 dB.

10. A method of detecting a near-end talking condition in an audio subsystem for use in a telephony terminal operable in handsfree mode, the subsystem comprising a receive path including a receive transducer for generating audio signals from a received signal, a transmit path including a transmit transducer for converting audio signals to electrical signals for transmission to a far-end user, and an acoustic echo canceller communicatively coupled between the receive and transmit paths, including a subtractor circuit connected serially in the transmit path and being responsive to control signals for controlling its operation, the method comprising the steps of:
   a) measuring the level of the total energy of the out-of-telephony-band components in the signal from the transmit transducer; and b) comparing the measured energy level with a first predetermined threshold whereby if the measured energy level exceeds the first predetermined threshold, near-end talking activity is deemed to exist.

11. A method as defined in claim 10 wherein the measurement step comprises the steps of filtering the telephony-band frequency components from the signal at the output of the transmit transducer and measuring the energy content of the remaining signal.

12. A method as defined in claim 11 wherein the filtering is achieved with a bandstop filter having predetermined characteristics to prevent telephony-band signals from passing therethrough.

13. A method as defined in claim 11 wherein the transmit path further comprises an analog-to-digital converter operating at a sampling rate of sixteen kilohertz and a factor-of-two down sampling circuit serially connected between the transmit transducer and the subtractor circuit, the input of the bandstop filter being connected at the junction of the converter and the down sampling circuit.

14. A method as defined in claim 12 wherein the frequency band of the filter is from about 200 Hz to about 4 Khz.

15. A method as defined in claim 12 wherein the stopband loss of the bandstop filter is about 50 dB.

16. A method for detecting a double talk condition in an audio subsystem for use in a telephony terminal operable in handsfree mode, the subsystem comprising a receive path including a receive transducer for generating audio signals from a received signal, a transmit path including a transmit transducer for converting audio signals to electrical signals for transmission to a far-end user, and an acoustic echo canceller communicatively coupled between the receive and transmit paths, including a subtractor circuit connected serially with the transmit transducer and being responsive to control signals for controlling its operation, the method comprising the steps of:

a) measuring the level of the total energy of the out-of-telephony-band components in the signal from the transmit transducer;

b) comparing the energy level obtained in step a) with a first predetermined threshold whereby if the measured energy level exceeds the first predetermined threshold, near-end talking activity is deemed to exist;

c) measuring the level of the signal on the receive path;

d) comparing the level of the signal in step c) with a second predetermined level, whereby if the measured level exceeds the second threshold, far-end activity is deemed to exist; and e) generating control signals to the acoustic echo canceller if both measured levels exceed their respective threshold.

17. A method as defined in claim 16 wherein the measurement step comprises the steps of filtering the telephony-band frequency components from the signal at the output of the transmit transducer and measuring the energy content of the remaining signal.

18. A method as defined in claim 17 wherein the filtering is achieved with a bandstop filter having predetermined characteristics to prevent telephony-band signals from passing therethrough.

19. A method as defined in claim 18 wherein the transmit path further comprises an analog-to-digital converter operating at a sampling rate of sixteen kilohertz and a factor-of-two down sampling circuit serially connected between the transmit transducer and the subtractor circuit, the input of the bandstop filter being connected at the junction of the converter and the down sampling circuit.

20. A method as defined in claim 19 wherein the frequency stopband of the filter is from about 250 Hz to about 4 Khz.

21. A method as defined in claim 20 wherein the stopband loss of the bandstop filter is selected to be about 50 dB.

* * * * *